(12) United States Patent
Hoffmann et al.

(10) Patent No.: US 10,511,158 B2
(45) Date of Patent: Dec. 17, 2019

(54) METHOD FOR PRODUCING A MULTIPLICITY OF SURGE ARRESTERS IN AN ASSEMBLY, SURGE ARRESTER AND SURGE ARRESTER ASSEMBLY

(71) Applicant: EPCOS AG, Munich (DE)

(72) Inventors: Robert Hoffmann, Berlin (DE); Frank Werner, Berlin (DE)

(73) Assignee: EPCOS AG, Munich (DE)

( * ) Notice: Subject to any disclaimer, the term of this patent is extended or adjusted under 35 U.S.C. 154(b) by 501 days.

(21) Appl. No.: 14/899,325

(22) PCT Filed: Jul. 30, 2014

(86) PCT No.: PCT/EP2014/066390
§ 371 (c)(1),
(2) Date: Dec. 17, 2015

(87) PCT Pub. No.: WO2015/014898
PCT Pub. Date: Feb. 5, 2015

(65) Prior Publication Data
US 2016/0141858 A1    May 19, 2016

(30) Foreign Application Priority Data
Aug. 2, 2013   (DE) .................. 10 2013 012 842

(51) Int. Cl.
*H01C 7/12*     (2006.01)
*H02H 1/00*     (2006.01)
*H02H 1/04*     (2006.01)
*H02H 3/22*     (2006.01)
*H02H 9/06*     (2006.01)
*H01T 21/00*    (2006.01)

(52) U.S. Cl.
CPC ............... *H02H 1/04* (2013.01); *H01T 21/00* (2013.01); *H02H 9/06* (2013.01)

(58) Field of Classification Search
CPC ............ H02H 9/06; H02H 1/04; H01T 21/00
USPC ........................................................ 361/118
See application file for complete search history.

(56) References Cited

U.S. PATENT DOCUMENTS 1,657,452 A    1/1928   Atherton
4,321,649 A    3/1982   Gilberts
(Continued)

FOREIGN PATENT DOCUMENTS

DE      2835017 A1    2/1980
DE    19615395 C2     9/1999
(Continued)

*Primary Examiner* — Thienvu V Tran
*Assistant Examiner* — Lucy M Thomas
(74) *Attorney, Agent, or Firm* — Slater Matsil, LLP

(57) ABSTRACT

A method is provided for manufacturing a plurality of arresters as a composite structure. A ceramic carrier having a plurality of holes and two electrode bodies are provided. The ceramic carrier and the two electrode bodies are assembled into a base under gas atmosphere. The ceramic carrier is located between the electrode bodies. The electrode bodies are soldered to the ceramic carrier. The base body is separated into a plurality of gas-filled arresters is carried out. In addition, a gas-filled arrester is provided which has a height of maximal 2 mm and electrode surfaces of maximal 1.2×1.2 mm².

19 Claims, 4 Drawing Sheets

(56) References Cited

U.S. PATENT DOCUMENTS

| | | | | |
|---|---|---|---|---|
| 5,243,257 | A | * | 9/1993 | Dietrich .................... H01T 4/04 |
| | | | | 313/574 |
| 5,671,114 | A | * | 9/1997 | Daumer .................... H01T 1/20 |
| | | | | 313/231.11 |
| 5,714,794 | A | | 2/1998 | Tsuyama et al. |
| 7,099,131 | B2 | * | 8/2006 | Tominaga ................ H01C 7/12 |
| | | | | 257/701 |
| 2009/0296294 | A1 | | 12/2009 | Liu |
| 2010/0254052 | A1 | * | 10/2010 | Katsumura ............... H01T 1/24 |
| | | | | 361/56 |

FOREIGN PATENT DOCUMENTS

| | | | |
|---|---|---|---|
| EP | 2190083 | A1 | 5/2010 |
| EP | 2447959 | A1 | 5/2012 |
| JP | S5738581 | A | 3/1982 |
| JP | S6069490 | U | 5/1985 |
| JP | 9306712 | A | 11/1997 |
| JP | 200091053 | A | 3/2000 |
| JP | 2000243534 | A | 9/2000 |
| JP | 2001143846 | A | 5/2001 |
| JP | 2001189186 | A | 7/2001 |
| JP | 2004127832 | A | 4/2004 |
| JP | 2009295570 | A | 12/2009 |
| JP | 2010182560 | A | 8/2010 |

* cited by examiner

US 10,511,158 B2

METHOD FOR PRODUCING A MULTIPLICITY OF SURGE ARRESTERS IN AN ASSEMBLY, SURGE ARRESTER AND SURGE ARRESTER ASSEMBLY

This patent application is a national phase filing under section 371 of PCT/EP2014/066390, filed Jul. 30, 2014, which claims the priority of German patent application 10 2013 012 842.0, filed Aug. 2, 2013, each of which is incorporated herein by reference in its entirety.

TECHNICAL FIELD

A method for manufacturing a plurality of arresters as a composite structure, an arrester, and a composite structure of arresters are provided.

BACKGROUND

An arrester may be used as a surge arrester. In the interior of the surge arrester, when a threshold voltage, the breakdown voltage, is exceeded, an arc-over occurs between two electrodes. The threshold voltage is referred to as the response DC voltage Urdc in the case of static or steady-state loading with a voltage rise of 100 V/s, and is referred to as the response surge voltage Urs in the case of dynamic loading with a voltage rise of 1 kV/μs. The arc is maintained by the feeding current as long as the electrical conditions for the arc exist.

SUMMARY

Known arresters are problematic because of the complex and therefore costly manufacturing processes, which are also poorly suited to manufacturing arresters having unconventional properties, for example, particularly small arresters.

Embodiments of the invention provide a simple and thus economically implementable manufacturing method for an arrester, which is capable of generating qualitatively high-value arresters as well as unconventional arresters. Additional embodiments provide an improved arrester.

A method is provided for manufacturing a plurality of arresters as a composite structure. In one step, the method comprises providing a ceramic carrier having a plurality of holes, and providing two electrode bodies. In a subsequent step, the method comprises assembling the ceramic carrier and the two electrode bodies under a gas atmosphere into a base body, wherein the ceramic carrier is situated between the electrode bodies. Subsequently, the electrode bodies are soldered to the ceramic carrier. The resulting base body is separated into a plurality of gas-filled arresters.

The advantage of such a method is that the manufacture of arresters may be carried out considerably more efficiently, as each arrester does not have to be assembled individually. As a result, the handling of the individual components during the manufacturing process is facilitated. Furthermore, the manufacturing time is reduced. In addition, the method also enables the manufacture of arresters which are significantly smaller than in the case of arresters assembled separately, generally manually, or at least individually. Since the individual process steps are less susceptible to defects, the defect rate may also be reduced in comparison to manual methods, and the probability of a later failure of the arrester is therefore reduced.

A ceramic carrier has, for example, an edge length of 35 mm or more. The ceramic carrier preferably has a square or rectangular surface area. The surface area of the electrode body preferably corresponds to the surface area of the ceramic carrier.

According to one specific embodiment, the electrode bodies may have protuberances which engage with the holes of the ceramic carrier during assembly. The protuberances are preferably conical. This facilitates the introduction of the protuberances into the holes of the ceramic carrier. The protuberances may also be cylinder-shaped or dome-shaped.

The height of the protuberances is preferably less than half the height of the ceramic carrier. As a result, during the assembly of the electrode bodies and the ceramic carrier into a base body, gas-filled hollow spaces are formed in the holes of the ceramic carrier.

The gas atmosphere may, for example, contain hydrogen or a noble gas such as helium, neon, argon, krypton, xenon, or a mixture of these gases.

Before soldering the base body, a solder layer may be arranged between the ceramic carrier and each of the electrode bodies. The solder layer covers at least the area in which the holes are situated. The solder layer may, for example, be applied to the ceramic carrier in the form of a solder paste. In particular, the solder layer may be applied to both sides of the ceramic carrier. The solder layer may, for example, be applied by means of a screen printing method. By using a pre-soldered ceramic, the complexity during the manufacture of the base body may be decreased. In an additional specific embodiment, the solder layer may be a solder foil. The solder foil may have a plurality of holes. The size and arrangement of the holes in the solder foil may match those of the ceramic carrier.

According to one specific embodiment, the hollow spaces in the holes of the ceramic carrier are sealed via the solder when soldering the base body.

The base body may be divided into individual arresters during the separation via sawing, water jet cutting, or laser cutting.

The ceramic carrier may include a matrix made up of 15×15 holes. The holes may be situated in an area which has a square or rectangular surface. The surface on which the holes are arranged has, for example, an edge length of 15 mm or more. The holes preferably have equal distances from each other. The holes are preferably arranged in rows and columns. As a result, the separation of the base body is facilitated. In particular, it may be prevented that individual arresters are damaged during the separation of the base body. The ceramic carrier may also have a different number of holes. For example, the ceramic carrier may include a matrix made up of 10×20 or 15×20 holes.

In addition, a gas-filled arrester is provided which has a height of maximal 2 mm and electrode surfaces of maximal 1.2×1.2 mm$^2$. The electrode surfaces correspond to the surface area of the arrester. The electrode surfaces may be square or rectangular.

The advantage of an arrester having such a ratio in dimensions is that it is particularly favorable due to its low material use. In addition, due to its small size, the arrester may be integrated into other components, for example, on a printed circuit board, in a particularly simple manner. In addition, since the individual process steps are less susceptible to defects, such an arrester is less susceptible to defects, and the probability of a later failure of the arrester is therefore reduced.

BRIEF DESCRIPTION OF THE DRAWINGS

The present invention is explained below based on schematic figures.

DETAILED DESCRIPTION OF ILLUSTRATIVE EMBODIMENTS

Figure 1:
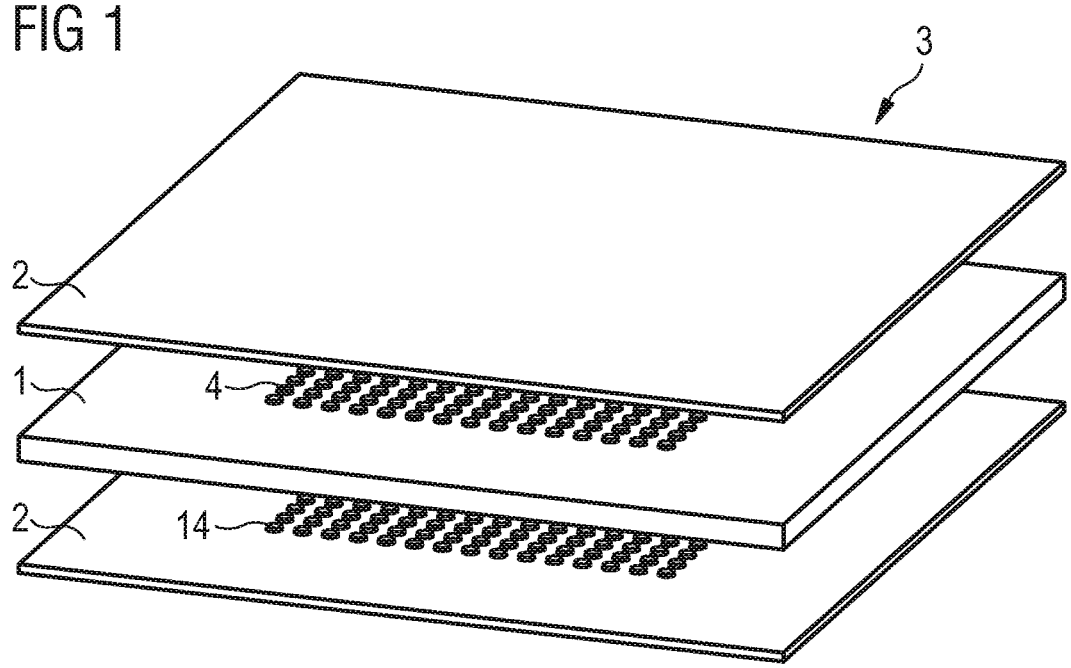
FIG. 1 shows a ceramic carrier and two electrode bodies in an exploded view.

FIG. 1 shows a ceramic carrier 1 and two electrode bodies 2. The ceramic carrier 1 has a plurality of holes 4. The electrode bodies 2 have a plurality of protuberances. The ceramic carrier 1 and the electrode bodies 2 together form a base body 3. FIG. 1 depicts the base body 3 in an exploded view. A solder layer (not shown here) is present between the ceramic carrier 1 and each of the electrode bodies 2.

Figure 2:
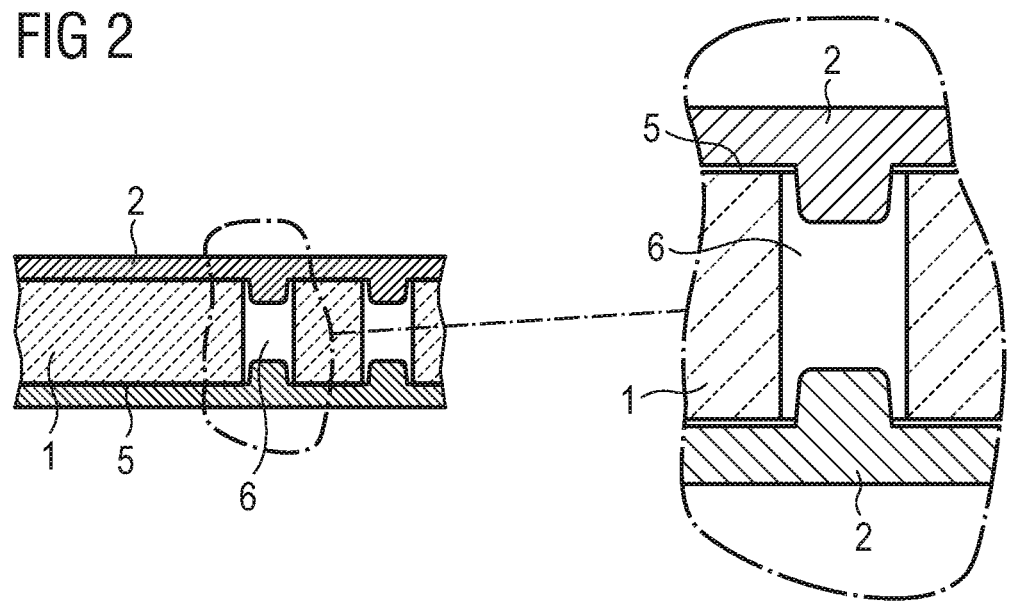
FIG. 2 shows a base body in a cross-sectional view.

FIG. 2 shows a section of a base body 3 in a cross-sectional view. The electrode bodies 2 and the ceramic carrier 1 are soldered by means of a solder layer 5. The holes 4 of the ceramic carrier 1 form hollow spaces 6 which are delimited by the electrode bodies 2. The solder layer 5 is also used to seal the hollow spaces 6. The assembly of the base body 3 is carried out in a gas atmosphere, so that the hollow spaces 6 are also filled with a gas.

Figure 3A:
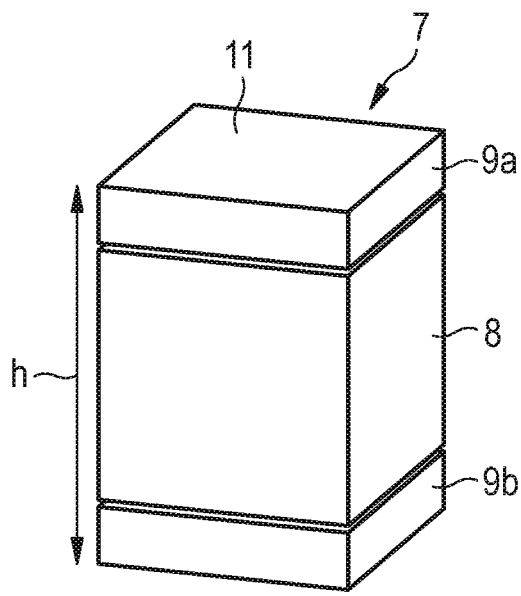
FIG. 3a shows an arrester in a cross-sectional view.

FIG. 3a shows a separated arrester 7. The arrester 7 includes a ceramic body 8 and two electrodes 9a, 9b. A gas-filled hollow space 6 is situated between the electrodes 9a, 9b, which is shown in FIG. 3b.

Figure 3B:
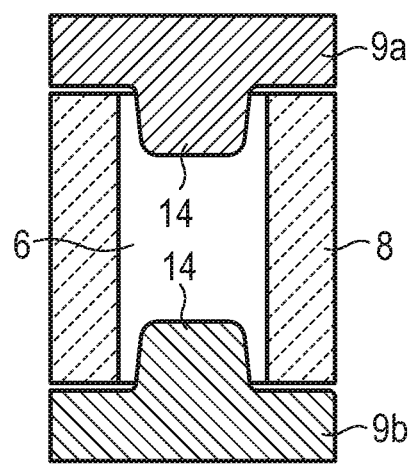
FIG. 3b shows an arrester.

FIG. 3b depicts the arrester 7 from FIG. 3a in a cross-sectional view. The arrester 7 has particularly small dimensions. For example, the arrester 7 has a height h of 2 mm. The dimensions of an electrode surface 11 of the arrester 7 are, for example, 1.2×1.2 mm². The electrode surface 11 corresponds to a surface area of the arrester 7. The arrester 7 may also have smaller dimensions. For example, the arrester 7 may have a height h of 1 mm and an electrode surface 11 of 0.5×0.5 mm².

Figure 4:
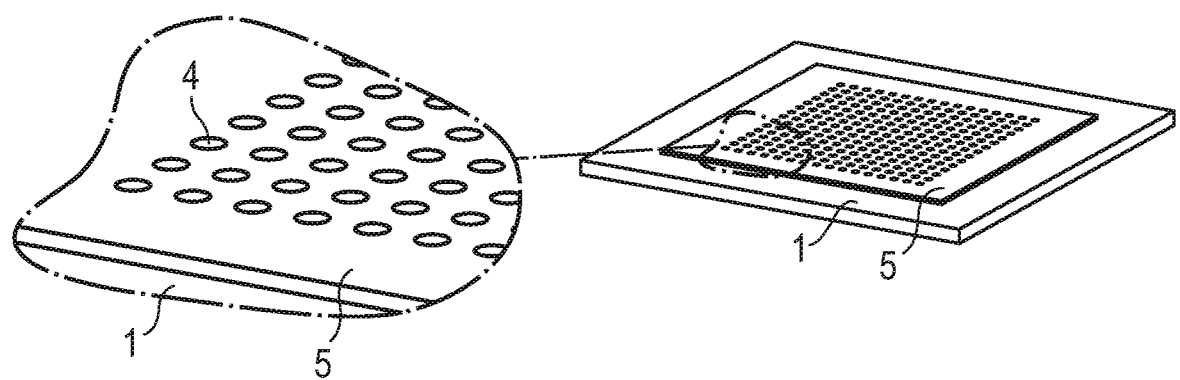
FIG. 4 shows a solder foil.
Figure 5:
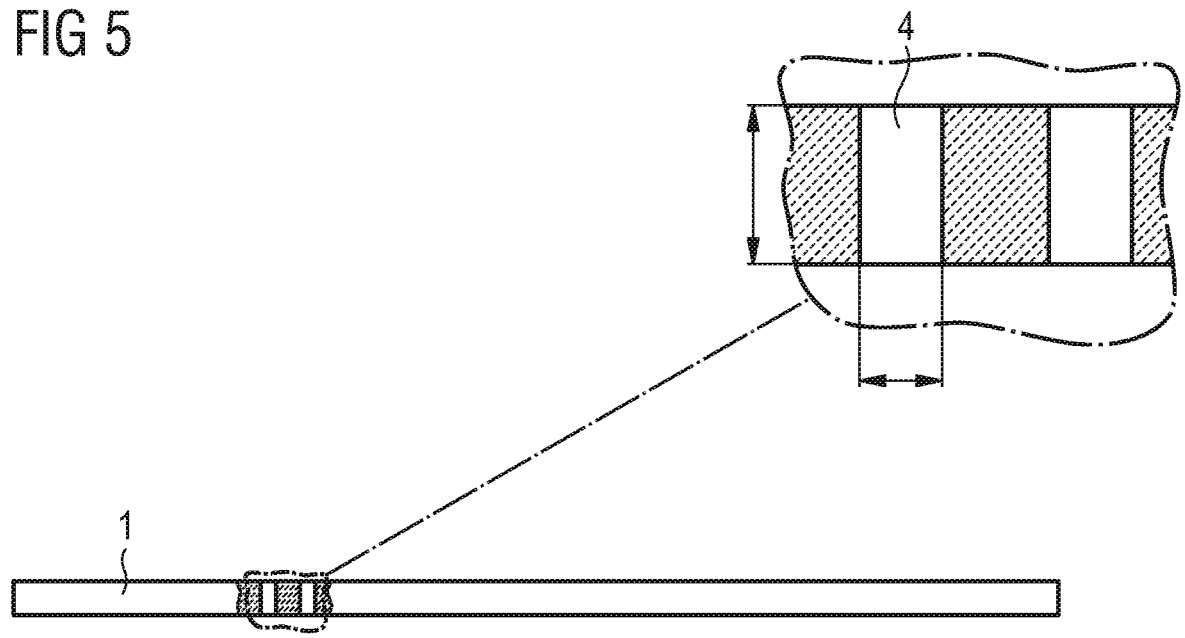
FIG. 5 shows a ceramic carrier including a solder layer.

FIG. 4 shows a ceramic carrier 1. FIG. 5 shows the ceramic carrier 1 from FIG. 4 in a cross-sectional view. The ceramic carrier 1 contains, for example, aluminum oxide, $Al_2O_3$, as a ceramic material. The ceramic carrier 1 has a plurality of holes 4. The height of the ceramic carrier 1 is 1.3 mm. The ceramic carrier 1 has a square shape with an edge length of 41 mm. The holes 4 have a diameter of 0.65 mm.

The holes 4 are spaced at uniform distances from each other. The centers of the holes 4 have a spacing of 1.5±0.02 mm from each other. In total, 225 holes 4 are arranged in 15 rows and 15 columns. The holes 4 form a square pattern. The region in which the holes are arranged has a square area with an edge length of 21±0.05 mm.

The ceramic carrier 1 shown in FIG. 4 is imprinted with a solder layer 5. The solder layer 5 covers a region having an area of 30×30 mm². The solder layer 5 covers the region in which the holes 4 are arranged.

Figure 6:
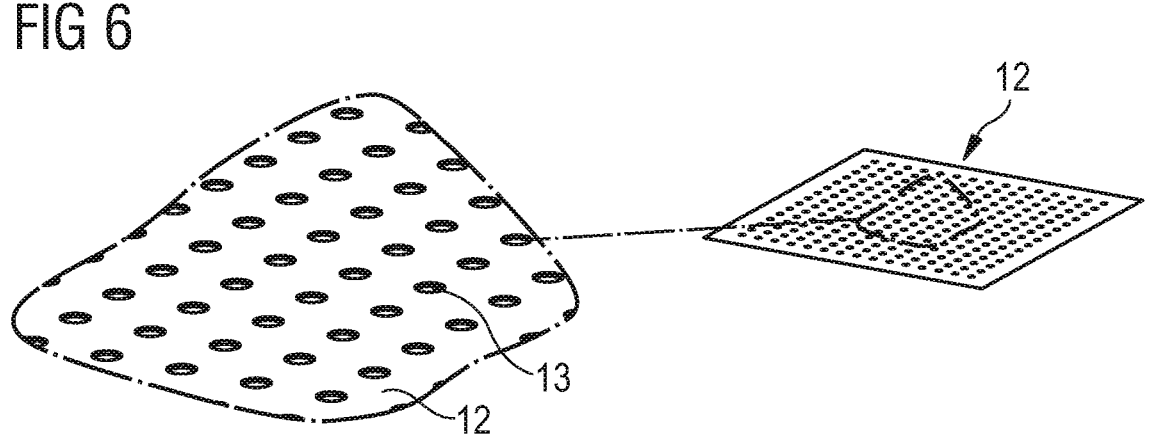
FIG. 6 shows a ceramic carrier in a cross-sectional view.

FIG. 6 shows a solder foil 12. The solder foil 12 may be arranged between the electrode bodies 2 and the ceramic carrier 1 before the soldering of the base body 3. The solder foil 12 may replace a solder layer imprinted on the ceramic carrier 1 as shown in FIG. 4. The solder foil 12 is square and has an edge length of 25 mm.

In total, two solder foils 12 are required for soldering a base body 3. The solder foil 12 has holes 13. The arrangement of the holes 13 of the solder foil 12 matches the arrangement of the holes 4 of the ceramic carrier 1. As a result, the holes 4 of the ceramic carrier 1 are not covered by the solder foil 12. The holes 13 of the solder foil also have a diameter of 0.65 mm. The height of the solder foil is 0.05 mm. The solder foil may contain silver. The solder foil is made up of, for example, a silver-copper eutectic or another solder material. For example, the solder foil 12 contains or is made up of the material Ag/Cu 72/28.

Figure 7:
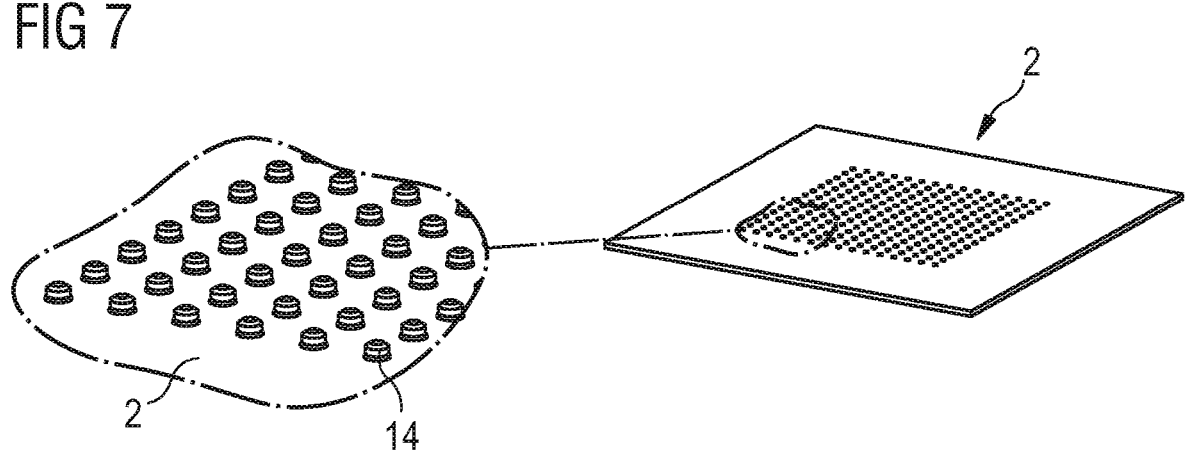
FIG. 7 shows an electrode body.
Figure 8:
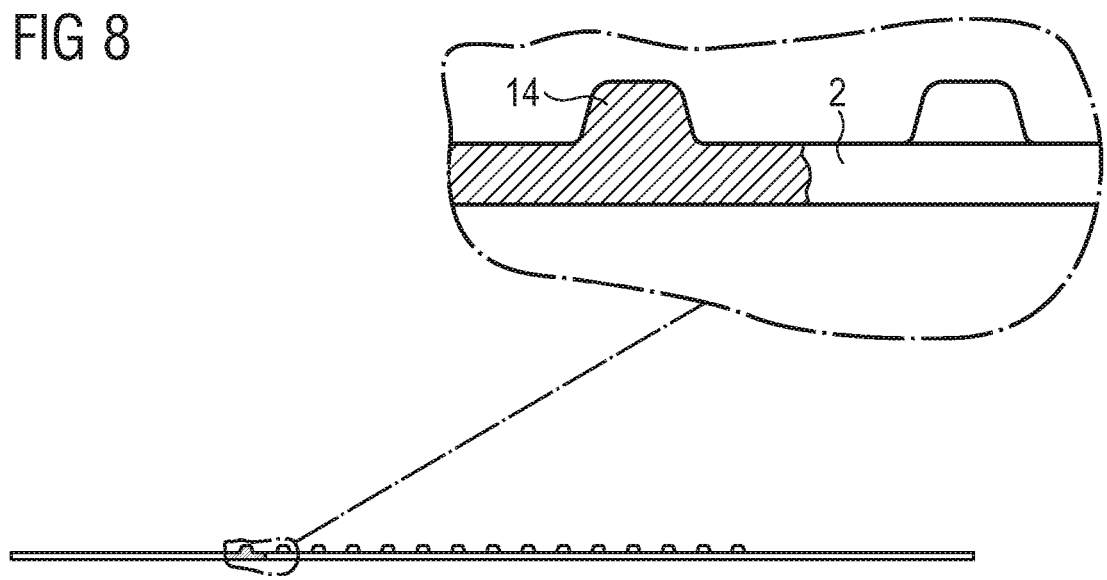
FIG. 8 shows an electrode body in a cross-sectional view.

FIG. 7 shows an electrode body 2. FIG. 8 shows the electrode body from FIG. 7 in a cross-sectional view. The surface of the electrode body 2 matches the surface of the ceramic carrier 1. The electrode body 2 has a plurality of protuberances 14. The number and arrangement of the protuberances 14 matches the number and arrangement of the holes 4 of the ceramic carrier 1. The electrode body 1 has an overall height of 0.6 mm. A basic height of the electrode body 2 without consideration of the protuberances 14 is 0.3 mm. Therefore, the protuberances 14 have a height of 0.3 mm.

As shown in FIG. 8, each of the protuberances 14 has the shape of a cone. At its widest point, the cone has a diameter of 0.52 mm. The cone narrows at an angle of 10°.

The electrode body 2 contains or is made up of an electrically conductive material. For example, the electrode body 2 contains an iron-nickel alloy or copper or is made up of such a material.

The invention claimed is:

1. A method for manufacturing a plurality of arresters, the method comprising:
   providing a ceramic carrier having a plurality of holes;
   providing first and second electrode bodies, wherein each of the first and second electrode bodies comprise a plurality of protuberances;
   assembling the ceramic carrier and the first and second electrode bodies under a gas atmosphere into a base body, wherein the ceramic carrier is located between the first and second electrode bodies such that the protuberances engage with and extend into the holes of the ceramic carrier;
   soldering the first and second electrode body to the ceramic carrier; and
   separating the base body into a plurality of gas-filled arresters.

2. The method according to claim 1, wherein gas-filled hollow spaces are formed in the holes of the ceramic carrier when assembling the ceramic carrier and the first and second electrode bodies into the base body.

3. The method according to claim 1, wherein, before soldering the base body, a solder layer is arranged between the ceramic carrier and each of the first and second electrode bodies.

4. The method according to claim 3, wherein the solder layer is a solder foil.

5. The method according to claim 3, wherein gas-filled hollow spaces are formed in the holes of the ceramic carrier when assembling the ceramic carrier and the first and second electrode bodies into the base body and wherein the gas-filled hollow spaces are sealed via solder when soldering the base body.

6. The method according to claim 1, wherein separating the base body comprises sawing, water jet cutting, or laser cutting.

7. The method according to claim 1, wherein the gas atmosphere contains noble gases or hydrogen.

8. The method according to claim 1, wherein the ceramic carrier includes a matrix made up of 15×15 holes.

9. The method according to claim 1, wherein each of the gas-filled arresters has a height of at most 2 mm and electrode surfaces of at most 1.2×1.2 mm².

10. The method according to claim 1, wherein each protuberance is conical, cylinder-shaped or dome-shaped.

11. A method of making an arrester composite structure comprising a plurality of gas-filled arresters manufactured according to the method of claim 1.

12. The method according to claim 1, wherein the thickness of each electrode body at the protuberances is greater than the thickness of that electrode body adjacent to the protuberances.

13. The method according to claim 1, wherein the thickness of each electrode body at the protuberances is greater than the thickness of that electrode body adjacent to the protuberances.

14. A method for manufacturing a plurality of arresters, the method comprising:
  providing a ceramic carrier having a plurality of holes;
  providing first and second electrode bodies, wherein each of the electrode bodies comprises a plurality of protuberances;
  providing two solder foils, each solder foil having a plurality of holes, the two solder foils being provided separately from the ceramic carrier and from the second electrode bodies;
  assembling the ceramic carrier, the solder foils and the first and second electrode bodies under a gas atmosphere into a base body such that the ceramic carrier is located between the solder foils such that the holes of the solder foils match with the holes of the ceramic carrier and wherein the ceramic carrier and the solder foils are located between the first and second electrode bodies such that the protuberances engage with and extend into the holes of the ceramic carrier and the holes of one of the solder foils;
  soldering the first and second electrode body to the ceramic carrier; and
  separating the base body into a plurality of gas-filled arresters.

15. The method of claim 14, wherein each of the plurality of gas-filled arresters has a height of at most 2 mm and electrode surfaces of at most 1.2×1.2 mm².

16. The method of claim 14, wherein separating the base body comprises sawing, water jet cutting, or laser cutting.

17. The method of claim 14, wherein the gas atmosphere contains noble gases or hydrogen.

18. The method of claim 14, wherein the ceramic carrier includes a matrix made up of 15×15 holes.

19. The method of claim 14, wherein the protuberances are conical, cylinder-shaped or dome-shaped.

* * * * *